(12) United States Patent
Menipaz et al.

(10) Patent No.: US 11,074,546 B2
(45) Date of Patent: Jul. 27, 2021

(54) GLOBAL BACK-END TAXONOMY FOR COMMERCE ENVIRONMENTS

(71) Applicant: eBay Inc., San Jose, CA (US)

(72) Inventors: Amit Reuven Menipaz, Los Gatos, CA (US); Ravi Polisetty, San Jose, CA (US); Suresh Raman, Santa Clara, CA (US); Gerald Law, San Jose, CA (US); Ming Liu, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 293 days.

(21) Appl. No.: 15/914,408

(22) Filed: Mar. 7, 2018

(65) Prior Publication Data

US 2018/0211209 A1   Jul. 26, 2018

Related U.S. Application Data

(63) Continuation of application No. 14/455,678, filed on Aug. 8, 2014, now Pat. No. 9,934,484.

(Continued)

(51) Int. Cl.
*G06Q 10/08* (2012.01)
*G06Q 30/06* (2012.01)
*G06F 16/28* (2019.01)

(52) U.S. Cl.
CPC ......... *G06Q 10/087* (2013.01); *G06F 16/285* (2019.01); *G06Q 10/0875* (2013.01); *G06Q 30/0601* (2013.01)

(58) Field of Classification Search
CPC ............. G06Q 10/087; G06Q 10/0875; G06Q 30/0601

(Continued)

(56) References Cited

U.S. PATENT DOCUMENTS 5,879,165 A * 3/1999 Brunkow ................. G09B 7/04
434/322
7,110,967 B1   9/2006 Espenes et al.
(Continued)

FOREIGN PATENT DOCUMENTS

WO   2015/021452 A1   2/2015

OTHER PUBLICATIONS

"Oracle Fusion Product Hub—Oracle Data Sheet", Retrieved from the Internet: <URL:https://cloud.oracle.com/_downloads/DataSheet_ProductMDM_ProdHub_pt_BR/erp-scm-datasheet-fusion-product-hub-cloud-service.pdf>, 2014, 4 Pages.
(Continued)

*Primary Examiner* — Florian M Zeender
*Assistant Examiner* — Christopher R Buchanan
(74) *Attorney, Agent, or Firm* — Holland & Hart LLP

(57) ABSTRACT

A method for defining, generating, and using a global back-end taxonomy is disclosed. It is identified that a listing of an item is exposed to a plurality of users of a first subsystem via a set of categories of a first front-end taxonomy. The listing of the item is mapped to a set of categories of a global back-end taxonomy, the global back-end taxonomy being maintained independently of the first front-end taxonomy and a second front-end taxonomy, the second front-end taxonomy being associated with a second subsystem. A category of the set of categories of the global back-end taxonomy is mapped to a category of a set of categories of the second front-end taxonomy associated with the second subsystem. The listing of the item is exposed to a plurality of users of the second subsystem via the set of categories of the second front-end taxonomy.

20 Claims, 8 Drawing Sheets

Related U.S. Application Data

(60) Provisional application No. 61/864,182, filed on Aug. 9, 2013.

(58) Field of Classification Search
USPC .................................................. 705/28, 22
See application file for complete search history.

(56) References Cited

U.S. PATENT DOCUMENTS

| | | | |
|---|---|---|---|
| 7,412,404 B1* | 8/2008 | Tenorio | G06Q 30/02 |
| | | | 707/999.008 |
| 7,797,377 B2 | 9/2010 | Linker et al. | |
| 8,055,548 B2* | 11/2011 | Staib | G06Q 10/107 |
| | | | 705/26.1 |
| 8,458,214 B1 | 6/2013 | Wilson | |
| 8,600,833 B1* | 12/2013 | Liden | G06Q 30/02 |
| | | | 705/26.1 |
| 9,443,245 B2* | 9/2016 | Sun | G06F 16/9535 |
| 9,934,484 B2 | 4/2018 | Menipaz et al. | |
| 2002/0010637 A1 | 1/2002 | Lieu et al. | |
| 2003/0115191 A1 | 6/2003 | Cooperman et al. | |
| 2004/0024739 A1* | 2/2004 | Copperman | G06F 16/367 |
| 2005/0125311 A1* | 6/2005 | Chidiac | G06Q 10/087 |
| | | | 705/28 |
| 2006/0282339 A1 | 12/2006 | Musgrove et al. | |
| 2007/0299743 A1 | 12/2007 | Staib et al. | |
| 2008/0040342 A1 | 2/2008 | Hust et al. | |
| 2008/0172329 A1 | 7/2008 | Kaufman et al. | |
| 2009/0326995 A1 | 12/2009 | Sorisi et al. | |
| 2014/0207620 A1* | 7/2014 | Nickerson | G06Q 30/0623 |
| | | | 705/26.61 |
| 2014/0279245 A1* | 9/2014 | Callanta | G06Q 30/0623 |
| | | | 705/26.61 |
| 2014/0280171 A1 | 9/2014 | Niles | |
| 2015/0046300 A1 | 2/2015 | Menipaz et al. | |

OTHER PUBLICATIONS

"Oracle Product Information Management Implementation Guide", Retrieved from the Internet: <URL:https://docs.oracle.com/cd/E18727_01/doc.121/e13108/T396819T396821.htm>, Accessed on Aug. 1, 2014, 39 pages.

Advisory Action received for U.S. Appl. No. 14/455,678, dated Aug. 9, 2017, 3 pages.

Final Office Action received for U.S. Appl. No. 14/455,678, dated May 26, 2017, 8 pages.

Non-Final Office Action received for U.S. Appl. No. 14/455,678, dated Dec. 16, 2016, 8 pages.

Notice of Allowance received for U.S. Appl. No. 14/455,678, dated Nov. 22, 2017, 8 pages.

Response to Final Office Action filed on Jun. 28, 2017, for U.S. Appl. No. 14/455,678, dated May 26, 2017, 24 pages.

Response to Non-Final Office Action filed on Mar. 9, 2017, for U.S. Appl. No. 14/455,678, dated Dec. 16, 2016, 24 pages.

Office Action received for Canadian Patent Application No. 2,920,529, dated Feb. 9, 2017, 4 pages.

First Examiner Report received for Australian Patent Application No. 2014306279, dated Oct. 5, 2016, 4 pages.

International Preliminary Report on Patentability received for PCT Application No. PCT/US2014/050453, dated Feb. 18, 2016, 7 pages.

International Search Report received for PCT Patent Application No. PCT/US2014/050453, dated Nov. 12, 2014, 2 pages.

Written Opinion received for PCT Patent Application No. PCT/US2014/050453, dated Nov. 12, 2014, 5 pages.

* cited by examiner

GLOBAL BACK-END TAXONOMY FOR COMMERCE ENVIRONMENTS

CROSS-REFERENCE TO RELATED APPLICATIONS

This application is a continuation of U.S. application Ser. No. 14/455,678, filed Aug. 8, 2014, which claims the benefit of U.S. Provisional Application No. 61/864,182, filed Aug. 9, 2013, each of which is incorporated herein by reference in its entirety.

TECHNICAL FIELD

The present invention relates generally to inventory classification and uses of inventory classification.

BACKGROUND

Inventory management is important in commerce, including both physical and electronic commerce. An aspect of inventory management may include using a taxonomy to classify inventory items.

BRIEF DESCRIPTION OF THE DRAWINGS

Some embodiments are illustrated by way of example and not limitations in the figures of the accompanying drawings.

DETAILED DESCRIPTION

Described in detail herein is an apparatus and method for formulating, generating, and using a global backend taxonomy in commerce environments. Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the example embodiments may be practiced without the use of these specific details. In other instances, well-known structures and processes are not shown in block diagram form in order not to obscure the description of the example embodiments with unnecessary detail. Thus, the present disclosure is not intended to be limited to the embodiments shown, but is to be accorded the widest scope consistent with the principles and features disclosed herein.

One way to effectively manage inventory, and, in turn, increase commerce, is to improve classification of items in an inventory. However, in order for businesses or other entities to implement an improved inventory classification scheme, there may be legacy inventory systems configured in accordance with a legacy taxonomy that can be converted or transitioned to a new taxonomy corresponding to the improved inventory classification scheme. For large inventories comprising millions or billions of items, such a conversion or transition may not be a trivial task. When inventories comprise items corresponding with a plurality of different languages, cultures, business units, or other particularities between subsets of inventory items, such a conversion or transition may similarly not be a trivial task. Moreover, it would be beneficial if the new taxonomy facilitates decoupling the inventory system from front-end or front-facing systems, such as customer interfacing or payment systems, thereby comprising a back-end system that can be converted/transitioned and maintained independently of changes to one or more front-end systems using the newly classified inventory.

Figure 1:
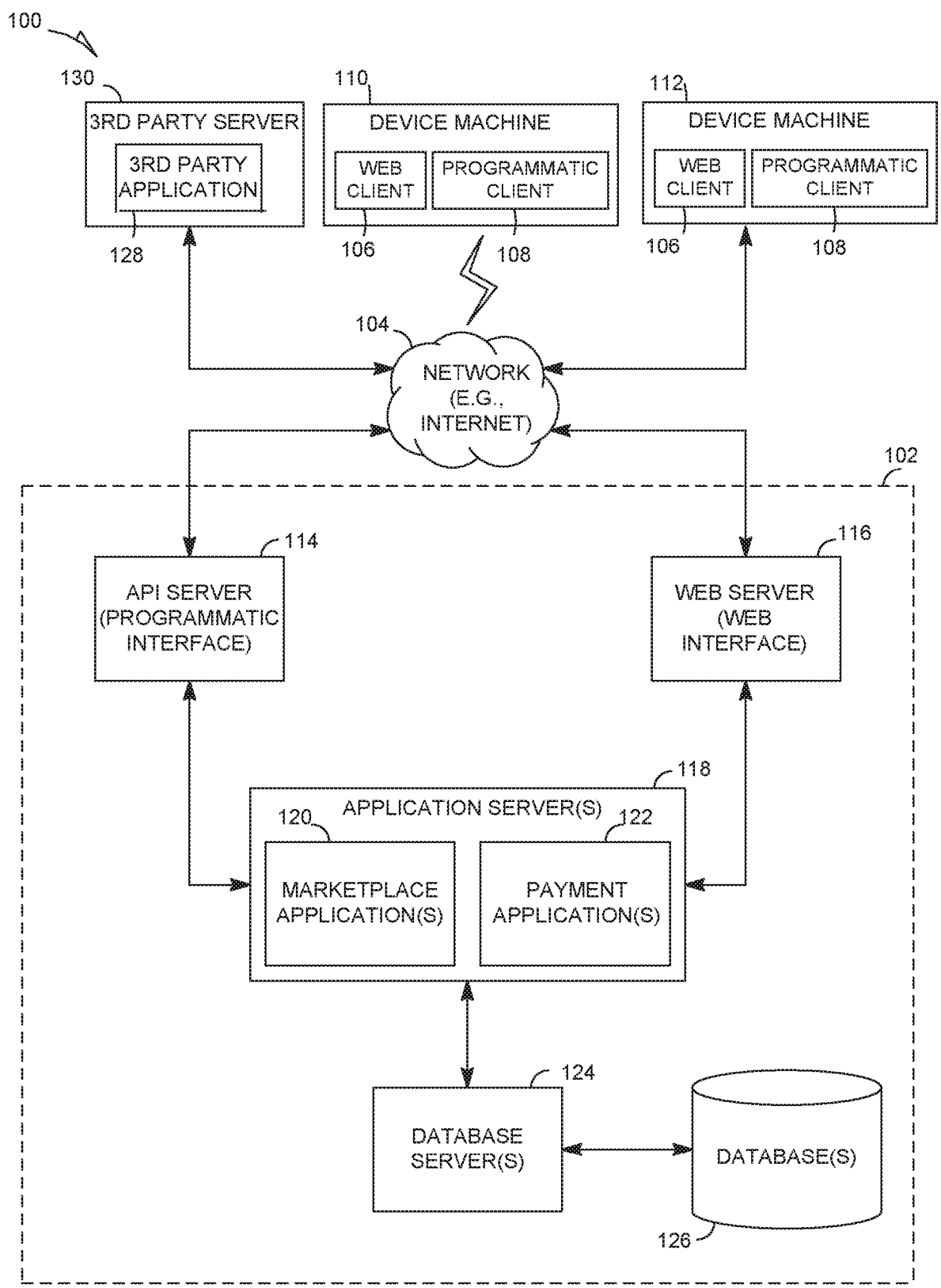
FIG. 1 is a block diagram illustrating a network architecture of a system, according to some embodiments, having a client-server architecture configured for exchanging data over a network.

FIG. 1 illustrates a network diagram depicting a network environment 100, according to one embodiment, having a client-server architecture configured for exchanging data over a network. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machines 110 and 112. In one embodiment, the network environment 100 comprises a marketplace system. In another embodiment, the network environment 100 comprises other types of systems such as, but not limited to, a social networking system, a matching system, a recommendation system, an electronic commerce (e-commerce) system, a search system, and the like.

Each of the device machines 110, 112 comprises a computing device that includes at least a display and communication capabilities with the network 104 to access the networked system 102. The device machines 110, 112 comprise, but are not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the device machines 110, 112 may communicate with the network 104 via a wired or wireless connection. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the device machines 110, 112 includes one or more applications (also referred to as "apps") such as, but not limited to, a web browser, messaging application, electronic mail (e-mail) application, an e-commerce site application (also referred to as a "marketplace application"), and the like. In some embodiments, if the e-commerce site application is included in a given one of the device machines 110, 112, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in a given one of the device machines 110, 112, the given one of the device machines 110, 112 may use its web browser to access the e-commerce site (or a variant thereof) hosted on the networked system 102. Although two device machines 110, 112 are shown in FIG. 1, more or less than two device machines can be included in the network environment 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access the networked system 102. E-commerce functions/services may include a number of publisher functions and services (e.g., search, listing, content viewing, payment). For example, the marketplace applications 120 may provide a number of services and functions to users for listing goods or services, listing offers for goods or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in the application servers 118 or the databases 126 accessible to the application servers 118 or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the networked system 102. In some embodiments, at least a portion of the marketplace applications 120 may be provided on the device machines 110 or 112.

Further, while the network environment 100 shown in FIG. 1 employs a client-server architecture, embodiments of the present disclosure are not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102. In an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

In addition to the networked system 102 facilitating e-commerce or electronic marketplace transactions, in some embodiments, the networked system 102 (or portions thereof) may comprise a back-end system for commerce environments, in general. For instance, the networked system 102 (or portions thereof) may handle payment, promotions, inventory management, or other support functions for storefront retailers. In any case, the databases 126 may include data corresponding to inventory available for commerce. Products, goods, services, or items comprising the inventory may be described and classified within the databases 126 to facilitate inventory management and/or sales.

Figure 2:
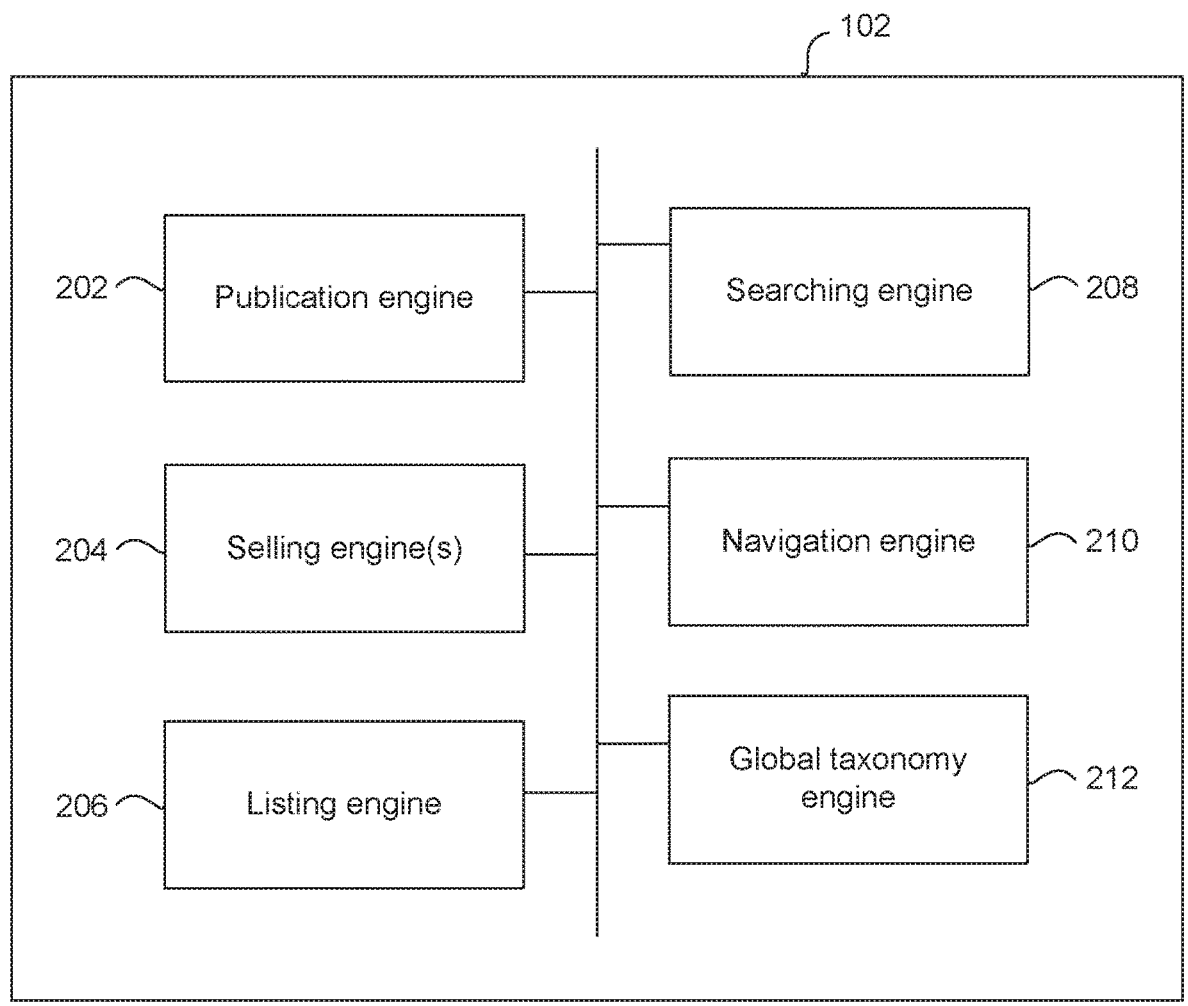
FIG. 2 is a block diagram illustrating components provided within the system of FIG. 1 according to some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of publishing, listing, and/or price-setting mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those key terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price, a discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., the device machine 110, 112) of the user. The searching engine 208 may record the query (e.g., keywords) and any subsequent user actions and behaviors (e.g., navigations, selections, or click-throughs).

The searching engine 208 also may perform a search based on a location of the user (e.g., detected using GPS). A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify, as part of the search query, a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below. For instance, a global backend taxonomy engine 212 may be included in the networked system 102 to perform the functions and operations described below.

Figure 3:
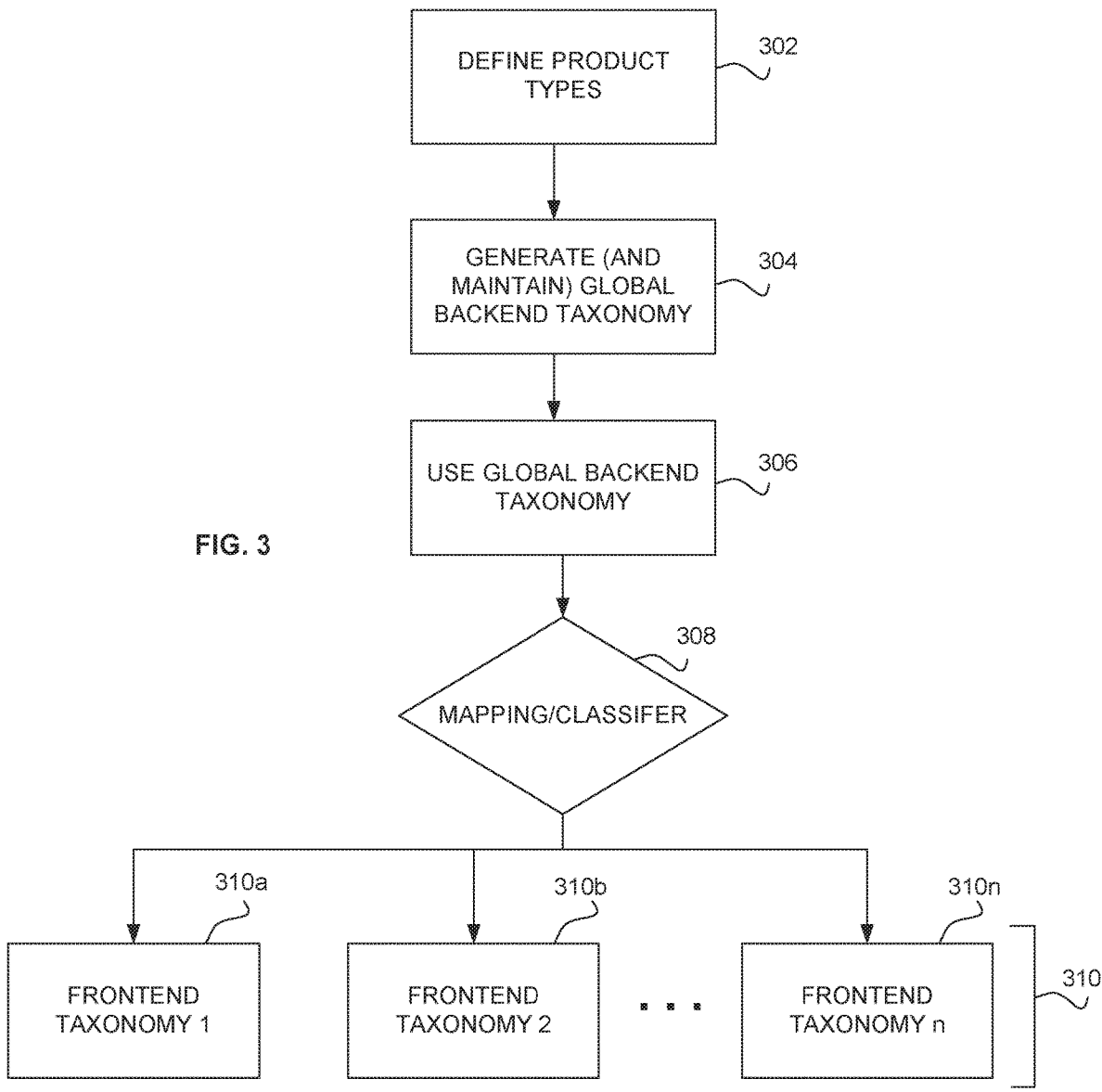
FIG. 3 is a block diagram illustrating a method pertaining to creation, maintenance, and uses of a product type ecosystem according to some embodiments.

FIG. 3 illustrates a diagram to facilitate creation, maintenance, and use of a product type ecosystem (also referred to as "global backend taxonomy" or "product type (PT) taxonomy") according to some embodiments. In some embodiments, inventory for a commerce environment is configured in accordance with the global backend taxonomy. The global backend taxonomy accommodates decoupling back-end systems/functionalities from front-end systems/functionalities, such as, but not limited to, websites, apps, payment, different business units, different geographies, or different subsidiaries. Front-end systems may thus be developed independently of back-end systems. The global backend taxonomy improves posting products to inventory, searching for products in inventory, and ultimately to driving conversion of potential sales.

At a block 302, product types are defined. Goods, services, items, and the like offered in commerce may collectively be referred to as products. Products included in an inventory may be categorized or classified in accordance with the following example data types (each of which may be types of nodes or sub-nodes in the global taxonomy):

Product Types (PT)

Product Types are created using a "form-function" principle (e.g., basketball shoe, tire pump). A list of product types can cover a universe of commerce goods. PT taxonomy is browse friendly taxonomy. It is a single taxonomy that is globally, applicable, and it may be mutually-exclusive.

Aspect-based SubTypes

Aspect-based SubTypes are more granular Product Types. For example, Handbag is a product type, whereas Style=Clutch or Baguette are sub types. One or more qualifying aspect names (e.g., Style) are used for a given Product Type to represent Sub-Type(s) of that Product Type.

Name Value pairs

Product Type nodes in the taxonomy contain name-value pairs, in order to cover the specification of an inventory that reside in those Product Types. For example, Basketball Shoe could have Size and Color as names. As another example, Jeans could have Gender as a name (with possible values including male or female).

Next at a block 304, using the product types above, a global backend taxonomy is generated. The products currently included in the inventory as well as products to be included in the inventory are configured in accordance with a global backend taxonomy. For existing products in the inventory, mapping is performed between the existing taxonomy to the new global backend taxonomy. Once the conversion is complete, ongoing maintenance is performed to maintain the converted inventory as well as products subsequently added to the inventory. Generation and maintenance of the global backend taxonomy may comprise:

PT to front-end (FE) Taxonomy mapping (and a reverse mapping), which may comprise:

Using a FE taxonomy, a backend (BE) taxonomy, and the inventory in the FE taxonomy.

Classifying the inventory in the FE taxonomy to the BE taxonomy provides an automatic/scalable way to map BE to FE taxonomies. In some embodiments, a module is configured to "machine learn" the mapping between taxonomies by classifying the product listings against the new taxonomy and auto-assigning a most common category ID amongst the inventory as the mapping to the old taxonomy.

Using subsets of taxonomy for different sites or markets, which may comprise:

Serving individual sites, markets or businesses from the global taxonomy, using configurable rules (e.g., filters, joins, splits).

Unifying inventory from different FE taxonomies into a single global BE taxonomy.

Discovery, which may comprise:

Mining search queries (and listing titles) for automated PT candidate detection.

Identifying bigrams among PT candidates helps to discover sub-types (e.g., footed pajamas)

Identifying PT candidates using entropy metrics (e.g., frequency of tokens in a very concentrated or spread out fashion).

Identifying unknown tokens by their co-occurrence with PTs (e.g., blue footed pajamas, red footed pajamas)—'blue' or 'red' become value candidates for color under the pajamas PT.

Classification, comprising various types:

Rules based: Direct match to listing title (and/or name-value (NV) pairs) using PT names and synonyms (e.g., ball gown in listing title will match directly to PT=Dress Regression based: Train a logistic regression classifier using training data of listing titles with PTs.

K-nearest neighbors (KNN) based: Use search engine to find similar titles (in training set) to given listing title.

Images based.

Classification with training set sourcing (e.g., applicable to any classification technique that needs training data), which may comprise:

Automating training set sourcing or at least relying less on humans manually classifying a training set of products.

Generating the training data of titles PTs from the training data of titles→Categories and using reverse mapping from category to PT (e.g., could be 1:1, 1:many or many:1).

Classification—Accessory and Bundle detection, which may comprise:

Using accessory and bundle detection to handle niche products.

Using rules: Related PTs will be marked with master or slave notations. If an item is detected to be in multiple PTs, the master or slave notations will be used to understand whether the item is an accessory or bundle.

Using the existing nomination for accessory detection.

For example, a product that is a printer with a camera may be classified as a camera or a printer. The accessory and bundle detection rules determine how to classify such a product.

With the inventory converted and unified into a global BE taxonomy, the global BE taxonomy can be used for one or more applications in connection with conducting commerce at blocks 306, 308, and/or 310. In various embodiments, at 308, a value a common backend reference index provides to various Front End taxonomies (blocks 310*a*, *b*, . . . , *n*) which interact with the backend taxonomy through a combination of data schema mappings and classifiers that are able to share inventory data across all Front End taxonomies in the right place by leveraging the common backend reference index. Potential applications include, but are not limited to, the following:

Improving inventory onboarding, including:

When creating product listings (e.g., to add products to the inventory), sellers designate the PT from the global taxonomy in the product listings.

In some embodiments, the sellers need not designate the PT if the product listing input system can automatically detect or classify PT with high precision.

Allowing global exposure of inventory (e.g., across geographies or businesses).

Improving finding (including CBT) or buying products in inventory, including:

Query classification: Classify queries to PTs using PT classifier. For example, "gucci handbag" should classify PT=handbag, no different than classifying a listing title to PT. PT provides a simpler, consistent definition of a listing or product (than categories).

PT drives search recall (e.g., "gucci handbag" should recall from PT=handbag and brand=gucci), thus no more category based recall.

PT drives relevance ranking. For example, "tennis" will span many PTs such as shoes, racquets, tickets, etc., and the ranking of matching products in inventory utilizes dominant PT to surface relevant items. As another example, tennis tickets may be presented with a higher relevance for a user that is a ticket buyer than a non-ticket buyer (e.g., relevance may factor in prior purchase history of the user conducting the query).

PT can also show diversity of results as discussed in the example above.

Figure 4:
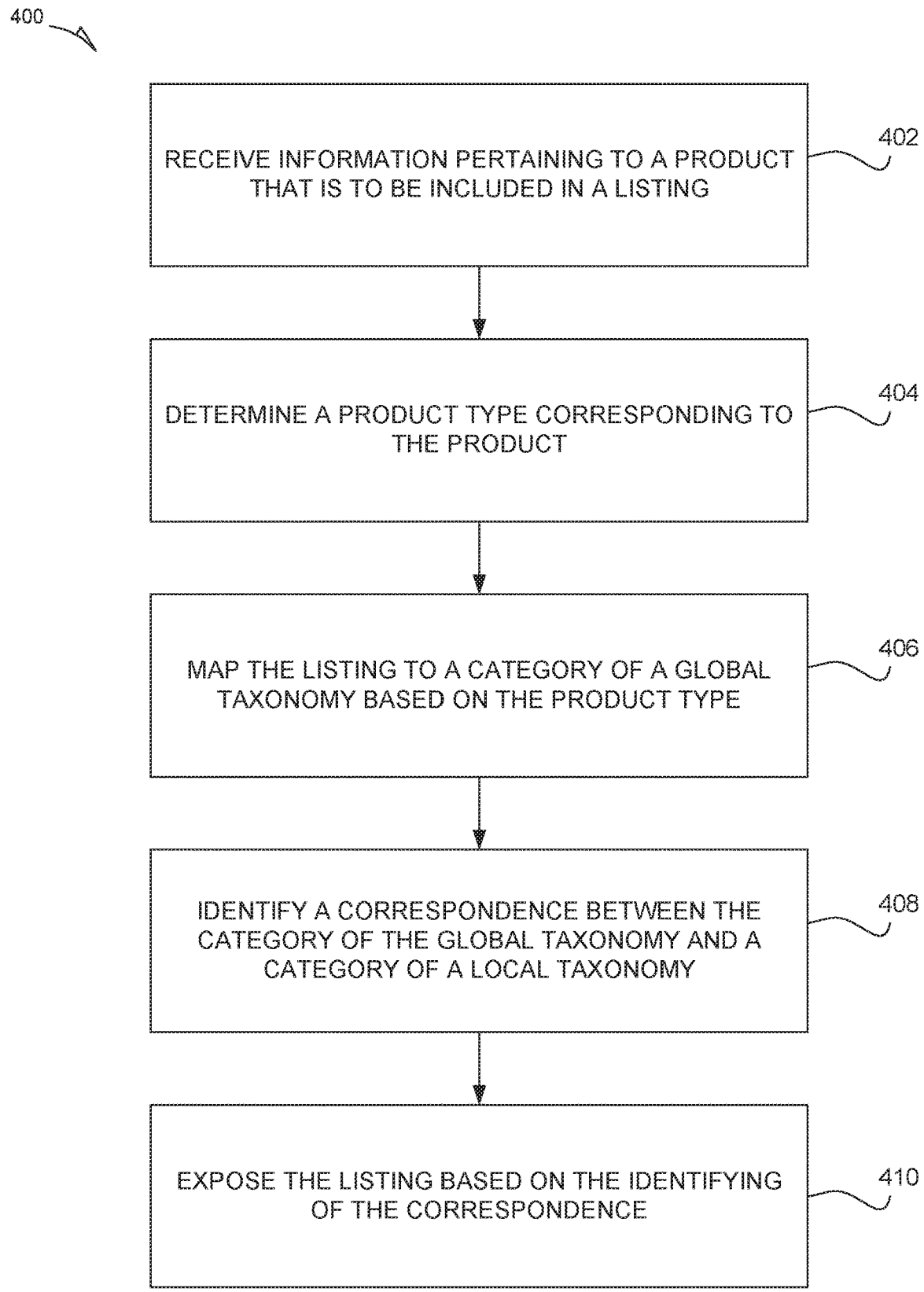
FIG. 4 is a block diagram illustrating a method of using a global back-end taxonomy to expose a listing of a product on a second e-commerce system that is posted with respect to a first e-commerce system.

PT drives browse experience (e.g., a default global FE taxonomy drives the browse experience), FIG. 4 is a block diagram illustrating a method 400 of using a global backend taxonomy to expose a listing of a product on a second e-commerce system that is posted with respect to a first e-commerce system. For example, a listing of an item posted by the seller of an item on a first system associated with a first geographical region (e.g., the United States) is exposed as a listing on a second system associated a second geographical region (e.g., Japan). In various embodiments, the first system and the second system are configured to use the global back-end taxonomy (e.g., via API calls to the global taxonomy engine 212) to facilitate cross-border trading. In various embodiments, the method 400 is implemented by one or more engines or modules of the networked system 102.

At operation 402, the global taxonomy engine 212 may receive information pertaining to a product that is to be included in a listing on the first e-commerce system. For example, the information may include a description of the item, a title of the item, a proposed classification for the item, or any information about the item provided by the seller or obtained from other sources based on the data provided by the seller. In various embodiments, some information may be entered by the seller of the item on a web page served by the first e-commerce system and other information about the item may be retrieved from other sources g databases of similar items, third party sources).

At operation 404, the global taxonomy engine 212 may determine a product type corresponding to the product. For example, the global taxonomy engine 212 may identify the product type based on the information provided by the seller. For example, the global taxonomy engine 212 may use the description or title provided by the seller to identify bigrams corresponding to product types.

At operation 406, the global taxonomy engine 212 may map the listing to a category of a global taxonomy based on the product type. In various embodiments, the global taxonomy may span listings of items on the first e-commerce system and listings of items on the second e-commerce system. In various embodiments, the first e-commerce system may classify listings using a first local taxonomy and the second e-commerce system may classify listings using a second local taxonomy. In various embodiments, the global taxonomy is independent of the first local taxonomy and the second local taxonomy. For example, in various embodiments, changes to the way in which a listing is classified using the first local taxonomy or the second local taxonomy may not have any effect on the way the listing is classified in the global taxonomy.

At operation 408, the global taxonomy engine 212 may identify a correspondence between the category of the global taxonomy and a category of the local taxonomy associated with the second e-commerce system (e.g., the second local taxonomy). For example, the listing module 206 may identify that items classified under a category of the second global taxonomy are commonly mapped independently to a particular category of the global taxonomy.

At operation 410, the global taxonomy engine 212 may expose (or provide) the listing to the second e-commerce system. Thus, a seller of a product who posts a listing for the product with respect to the first system, using the local taxonomy of the first system, may benefit from the listing being exposed on the second system within the local taxonomy of the second system. For example, such exposure may facilitate cross-border trading (CBT) between individuals of a first geography in which the first system is deployed and a second geography in Which the second system is deployed. In various embodiments, a seller need not know anything about the local taxonomy of the second system on which the listing is exposed.

Figure 5:
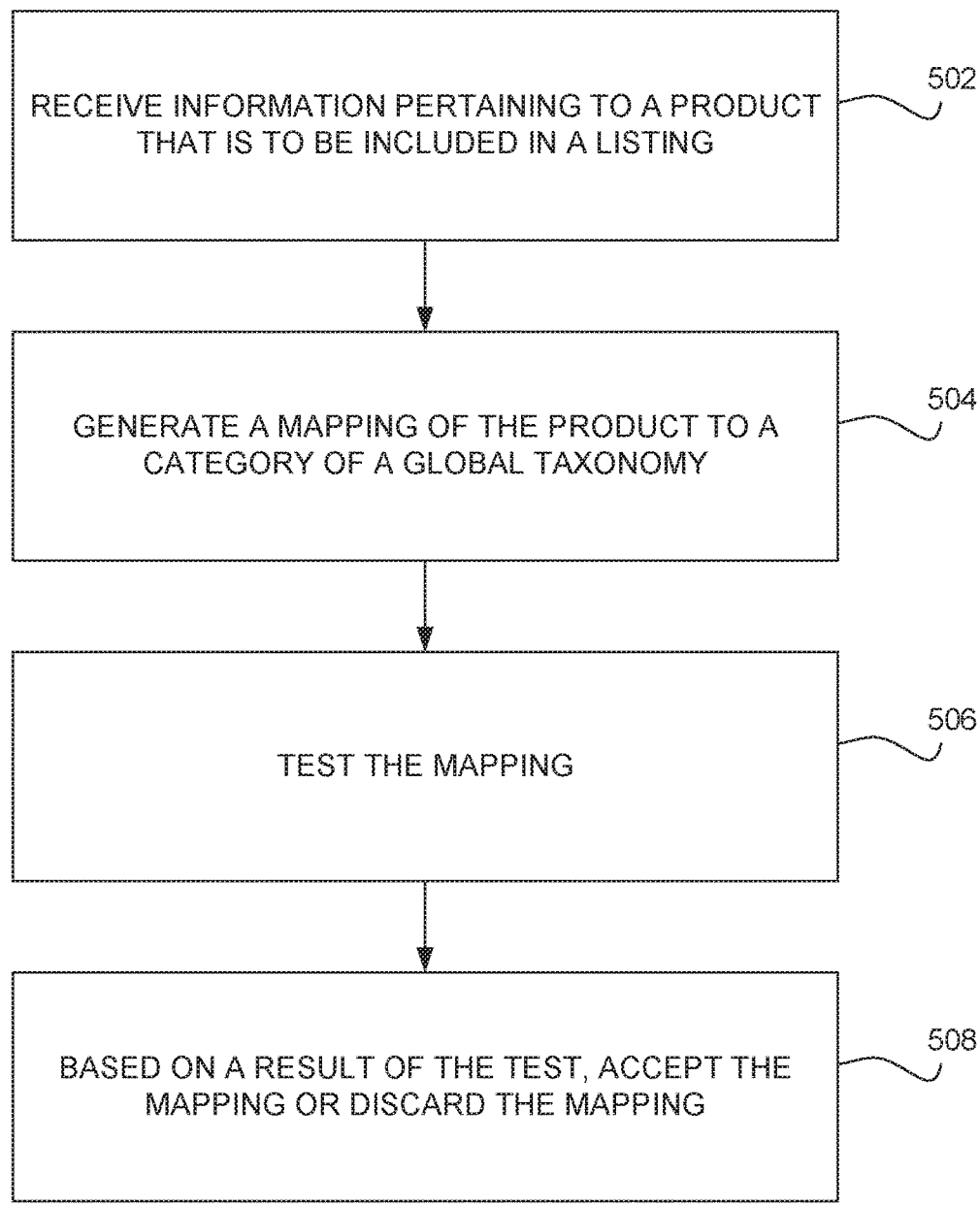
FIG. 5 is a block diagram illustrating a method of using machine-learning to improve categories associated with a global taxonomy.

FIG. 5 is a block diagram illustrating a method 500 of using machine-learning to improve categories associated with a global taxonomy. In various embodiments, the method 500 is implemented by one or more engines or modules of the networked system 102.

At operation 502, global taxonomy engine 212 may receive information pertaining to a product that is to be included in a listing on an e-commerce system. For example, as described above, a seller may provide information about the item, such as a title for the item, a description of the item, and so on.

At operation 504, global taxonomy engine 212 may generate a mapping of the product to a category of a global taxonomy associated with the e-commerce system. For example, the global taxonomy engine 212 may generate a mapping of the product to a category based on an identified type of the product.

At operation 506, the global taxonomy engine 212 may test the mapping. For example, the global taxonomy engine 212 may determine whether a seller of the item accepts the mapping as an acceptable mapping (e.g., via an input when the seller submits a listing for the item). Alternatively, the global taxonomy engine 212 may determine whether users searching for the product are able to find the product when it is associated with the category of the global taxonomy to which it is mapped. Further still, the global taxonomy engine 212 may use data sets of previously gathered data pertaining to classifications of similar items to determine whether the classifications remain accurate in view of a newly generated rule pertaining to the classification of the item.

At operation 508, based on the result of the test, the global taxonomy engine 212 may either accept the mapping as an accurate mapping or discard the mapping as an inaccurate mapping. If the rule pertaining to the new mapping is accurate, the global taxonomy engine 212 may then incorporate the rule in future classifications of similar products with respect to the global taxonomy. If the rule is inaccurate, the global taxonomy engine 212 may seek to generate a better rule to classify the product with respect to the global taxonomy.

Figure 6:
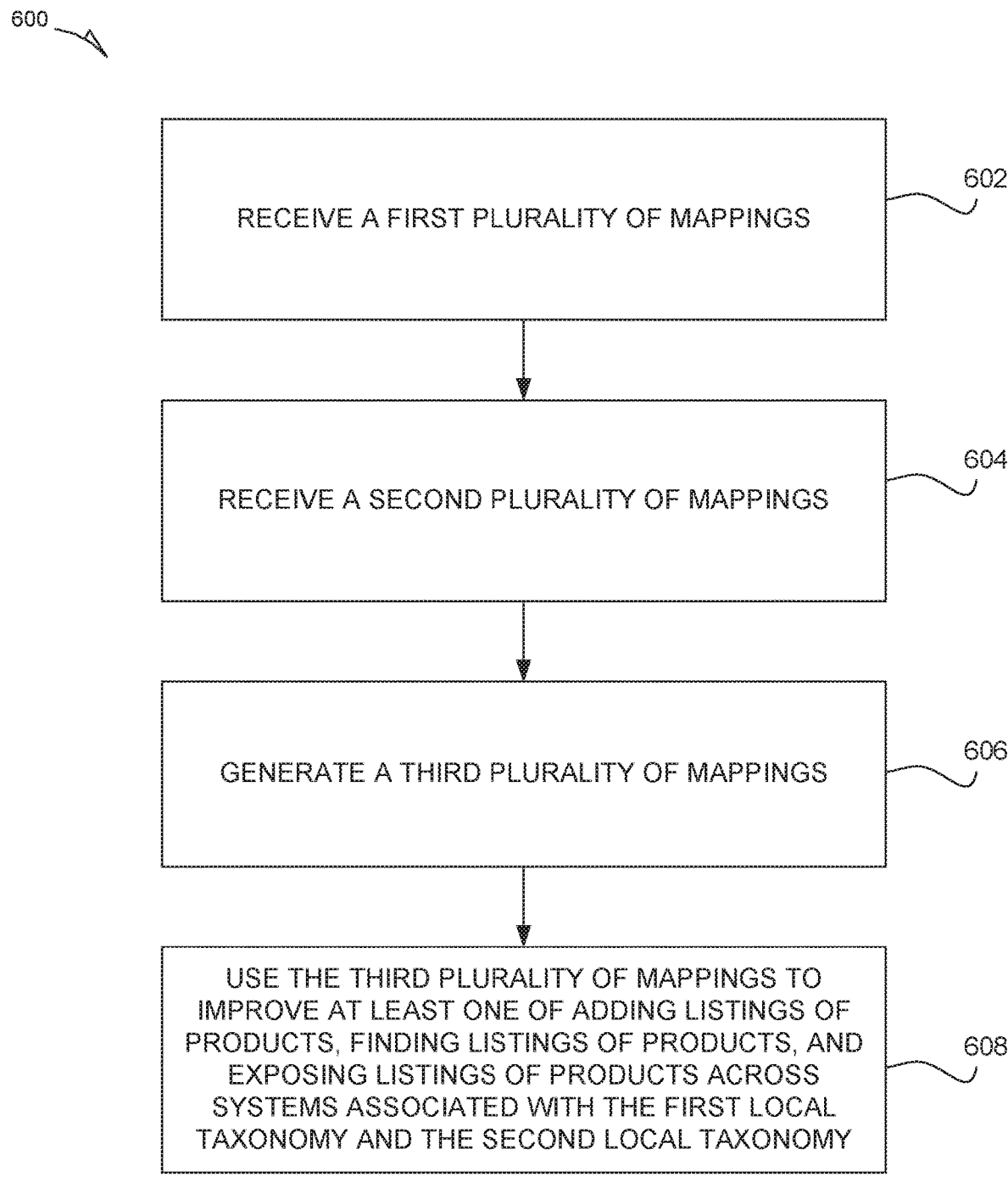
FIG. 6 is a block diagram illustrating a method of mapping a global taxonomy to a first local taxonomy and a second local taxonomy to improve features of an e-commerce system that uses the taxonomies to classify products.

FIG. 6 is a block diagram illustrating a method 600 of mapping a global taxonomy to a first local taxonomy and a second local taxonomy to improve features of an e-commerce system that uses the taxonomies to classify products. In various embodiments, the method 600 is implemented by one or more engines or modules of the networked system 102.

At operation 602, the global taxonomy engine 212 may receive a first plurality of mappings. Here, the first plurality of mappings may map a plurality of listings of a first plurality of products to a plurality of categories of a first local taxonomy. In various embodiments, the first local taxonomy may be a country-specific taxonomy (e.g., using a particular language) or a market-specific taxonomy (e.g., a market specific to automobiles). In various embodiments, at least a portion of the categories of the first taxonomy may be ad-hoc categories generated by sellers of the products listed on a first e-commerce system, web site, or application.

At operation 604, the global taxonomy engine 212 may receive a second plurality of mapping. Here, the second plurality of mappings may map a plurality of listings of a second plurality of products to a second local taxonomy. In various embodiments, the second local taxonomy may be specific to a different country or market than the first local taxonomy. In various embodiments, at least a portion of the categories of the second taxonomy may be ad-hoc categories defined by sellers of the products listed on a second e-commerce system, web site or application. As such, the first taxonomy and second taxonomy may categorize some listings pertaining to the same products under entirely different categories, including categories using different descriptive terms and even different languages.

At operation 606, the global taxonomy engine 212 may generate a third plurality of mappings. Here, the third plurality of mappings may map the plurality of listings of the first plurality of products and the plurality of listings of the second plurality of products to a plurality of categories of a global taxonomy. The plurality of categories of the global taxonomy may be generated and maintained independently of each of the first local taxonomy and the second local taxonomy. For example, the plurality of categories of the global taxonomy may correspond to types of products. In various embodiments, the mappings between the local taxonomies and the global taxonomies may be based on machine-learning, of the mappings (e.g., as described above with respect to FIG. 5.) In various embodiments, the mappings between the local and global taxonomies may be at least partially determined by input from an administrator of the networked system 102.

At operation 608, the global taxonomy engine 212 may use the third plurality of mappings to improve features of the networked system 102. Such features may include improving processes associated with posting new listings of products, finding existing listings of products, and exposing new and existing listings of products across systems associated with the first local taxonomy and the second local taxonomy (e.g., as described above with respect to FIG. 3).

Figure 7:
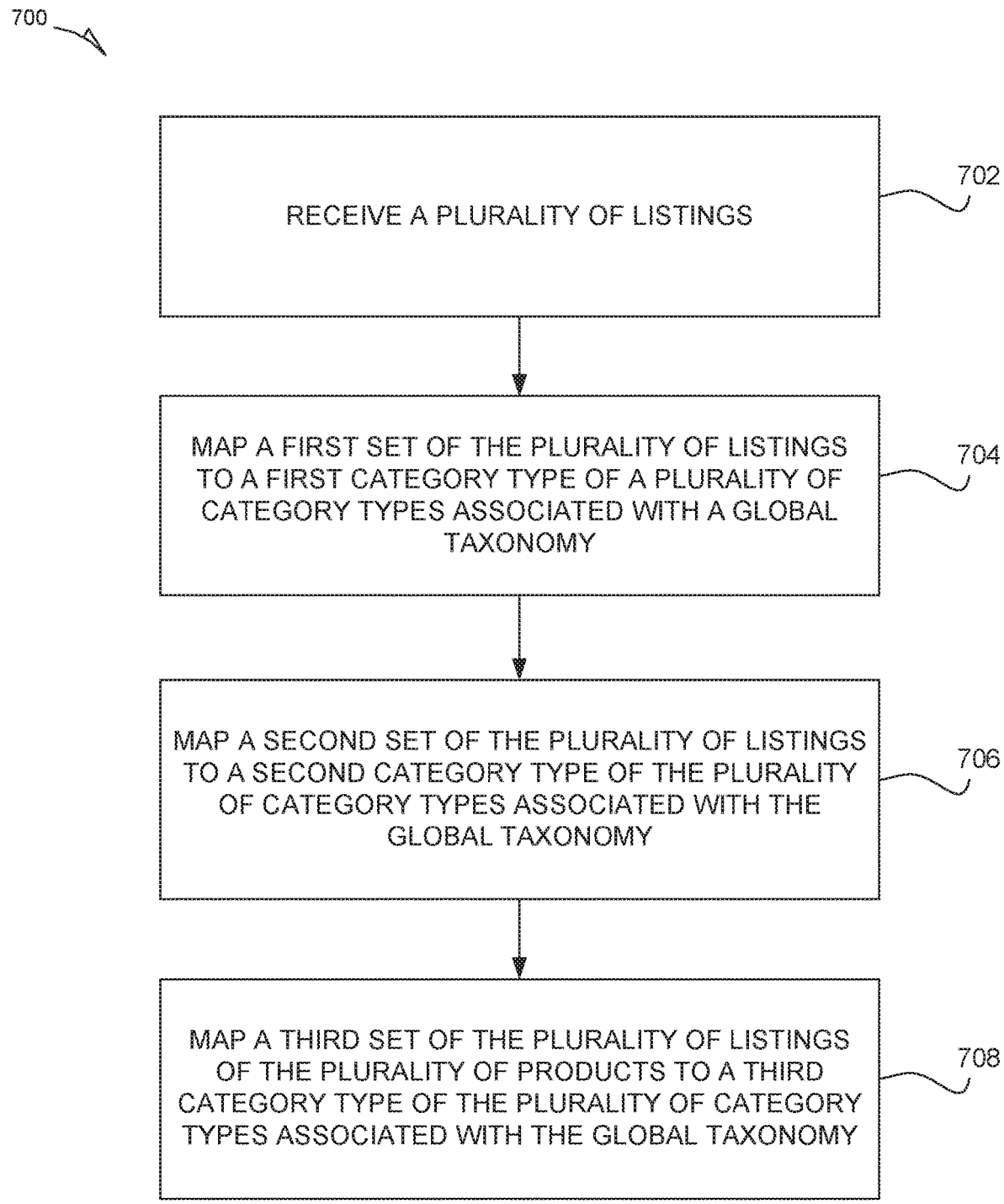
FIG. 7 is a block diagram illustrating a method of mapping a plurality of listings of a plurality of products to category types associated with a global taxonomy.

FIG. 7 is a block diagram of a method 700 of mapping a plurality of listings of a plurality of products to category types associated with a global taxonomy. In various embodiments, the method 700 is implemented by one or more engines or modules of the networked system 102.

At operation 702, the global taxonomy engine 212 may receive a plurality of listings of a plurality of products. As described above, the listings may include information provided by sellers of the products, information gathered from databases pertaining to the product or similar products, or third-party or external systems configured to provide additional information pertaining to the products based on information received, collected, or otherwise known about the products.

At operation 704, the global taxonomy engine 212 maps a first set of the plurality of listings of the plurality of products to a first category type of a plurality of category types associated with a global taxonomy. In various embodiments, the first category type corresponds to a product type (e.g., as described above with respect to FIG. 3). For example, based on a determination that the product is of a particular product type, the listing of the product may be mapped to a category of the global taxonomy that is associated with that product type.

At operation 706, the global taxonomy engine 212 maps a second set of the plurality of listings of the plurality of products to a second category type of the plurality of category types associated with the global taxonomy. In various embodiments, the second category type corresponds to an aspect-based product subtype (e.g., as described above with respect to FIG. 3). For example, based on a determination that a product is of a particular product subtype, the listing of the product may be mapped to a category of the global taxonomy that is associated with that product subtype. In various embodiments, the product type and product subtype categories have a parent-child relationship in the global taxonomy.

At operation 708, the global taxonomy engine 212 maps a third set of the plurality of listings of the plurality of products to a third category type of the plurality of category types associated with the global taxonomy, the third category type corresponding to a name-value-pair product subtype (e.g., as described above with respect to FIG. 3). For example, based on a determination that a product has a particular name-value pair, the listing of the product may be mapped to a category of the global taxonomy that is associated with the aspect-value pair. In various embodiments, each product type category of the global taxonomy and each product subtype category of the global taxonomy may be associated with one or more aspect-value-pair subclassifications. In various embodiments, within the global taxonomy, the product type categories and product subtype categories may each be parent categories and the aspect-value-pair categories may be child categories of these parent categories.

Figure 8:
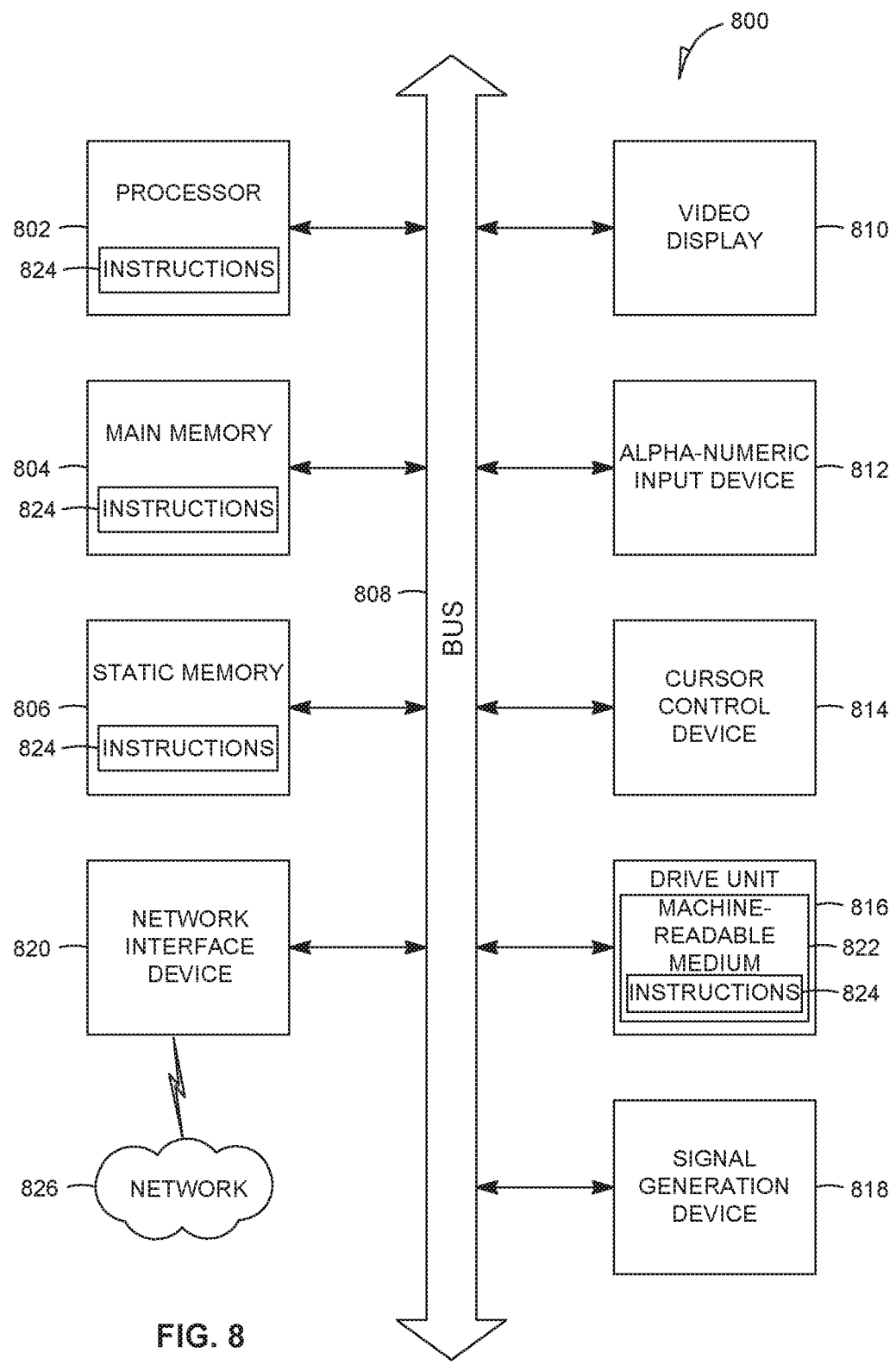
FIG. 8 is a block diagram illustrating a diagrammatic representation of a machine in the example form of a computer system within which a set of instructions may be executed to cause the machine to perform any one or more of the methodologies discussed herein.

In various embodiments, the global taxonomy engine 212 may be configured to adopt at least a portion of a global taxonomy as a front-end taxonomy. Thus, for example, the global taxonomy engine 212 may generate a front-end taxonomy based on the global taxonomy such that, for example, there are one-to-one mappings between the data types of the front-end taxonomy and the data types of the back-end taxonomy. Alternatively, a front-end taxonomy (or portions of the front-end taxonomy) may be bypassed, allowing the corresponding portions of the back-end taxonomy to be accessed directly as if they were included in the front-end taxonomy. Thus, in various embodiments, an administrator of a system may not be required to manually configure or maintain all or portions of the front-end taxonomy of the system if the corresponding portions of the back-end taxonomy are deemed acceptable. The global taxonomy engine 212 may be further configured to automatically propagate any changes made to the back-end taxonomy (e.g., through machine learning, as described above) to the front-end taxonomy. For example, as changes to other front-end taxonomies (e.g., of other commerce systems that do not adopt the global taxonomy as their own) are integrated into the back-end taxonomy (e.g., through machine-learning), the changes to the global taxonomy may be automatically reflected in any front-end taxonomy that adopts at least portions of the global taxonomy as its own. Furthermore, the global taxonomy engine 212 may be configured to automatically select adopt portions of the back-end taxonomy for adoption into a front-end taxonomy based on an analysis of testing of the effectiveness of the back-end taxonomy at categorizing the items listed with respect to the front-end taxonomy (e.g., as described in FIG. 5), FIG. 8 shows a diagrammatic representation of a machine in the example form of a computer system 800 within which a set of instructions, for causing the machine to perform any one or more of the methodologies discussed herein, may be executed. The computer system 800 comprises, for example, any of the device machine 110, device machine 112, applications servers 118, API server 114, web server 116, database servers 124, or third party server 130. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., liquid crystal display (LCD), organic light emitting diode (OLED), touch screen, or a cathode ray tube (CRT)). The computer system 800 also includes an alpha-numeric input device 812 (e.g., a physical or virtual keyboard), a cursor control device 814 (e.g., a mouse, a touch screen, a touchpad, a trackball, a trackpad), a drive unit 816, a signal generation device 818 (e.g., a speaker), and a network interface device 820.

The drive unit 816 includes a machine-readable medium 822 on which is stored one or more sets of instructions 824 (e.g., software) embodying any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    one or more computer processors;
    one or more computer memories;
    one or more modules of a global back-end taxonomy system incorporated into the one or more computer memories, the one or more modules configuring the one or more computer processors to perform operations for updating mappings between products of a plurality of front-end taxonomies with a global back-end taxonomy, the operations comprising:
        receiving, from a first system, first information pertaining to a first product that is to be listed on a first front-end taxonomy of the plurality of front-end taxonomies for the first system;
        generating, by a global taxonomy module of the one or more modules, a mapping of the first product to a category of a global taxonomy;
        displaying an additional listing for the first product in a user interface for a second front-end taxonomy of the plurality of front-end taxonomies for a second system;
        receiving a first user input with respect to the displayed additional listing;
        testing, by the global taxonomy module of the one or more modules, the mapping based at least in part on the first user input;
        based on the testing reflecting a performance that transgresses a performance threshold, accepting the generated mapping for use in mapping additional products to the category of the global taxonomy;
        receiving, from the first system, second information pertaining to a second product that is to be listed on the first front-end taxonomy for the first system;
        classifying, by the global taxonomy module of the one or more modules, the second product within the category of the global taxonomy based at least in part on the accepted mapping and the second information;
        displaying a second listing for the second product in a second user interface for the second front-end taxonomy based at least in part on the classifying; and
        receiving, via the second user interface, a second user input corresponding to a transaction for the second product.

2. The system of claim 1, wherein the operations further comprise:
    determining whether users searching for the first product are able to find the additional listing for the first product in the user interface for the second front-end taxonomy.

3. The system of claim 1, wherein the generating of the mapping includes generating a rule for classifying the first product that is applicable to additional products, the additional products being similar to the first product.

4. The system of claim 1, wherein the operations further comprise:
    generating the global back-end taxonomy from product types discovered in an inventory of the first front-end taxonomy.

5. The system of claim 1, wherein the first front-end taxonomy corresponds to a first geographical region and the second front-end taxonomy corresponds to a second geographical region, the first geographical region being separated by a border from the second geographical region.

6. The system of claim 1, wherein the operations further comprise:
    determining whether a seller of one of the additional products accepts the mapping via seller user input received via the user interface for the second front-end taxonomy when submitting a listing for the one of the additional products.

7. The system of claim 1, wherein the operations further comprise:
    based on the testing reflecting a performance that does not transgress the performance threshold, discarding the mapping as an inaccurate mapping.

8. A method for updating mappings between products of a plurality of front-end taxonomies with a global back-end taxonomy, the method comprising:
    receiving, from a first system, first information pertaining to a first product that is to be listed on a first front-end taxonomy of the plurality of front-end taxonomies for the first system;
    generating, by a global taxonomy module of one or more modules, a mapping of the first product to a category of a global taxonomy;
    displaying an additional listing for the first product in a user interface for a second front-end taxonomy of the plurality of front-end taxonomies for a second system;
    receiving a first user input with respect to the displayed additional listing;
    testing, by the global taxonomy module of the one or more modules, the mapping based at least in part on the first user input;
    based on the testing reflecting a performance that transgresses a performance threshold, accepting the generated mapping for use in mapping additional products to the category of the global taxonomy;

receiving, from the first system, second information pertaining to a second product that is to be listed on the first front-end taxonomy for the first system;

classifying, by the global taxonomy module of the one or more modules, the second product within the category of the global taxonomy based at least in part on the accepted mapping and the second information;

displaying a second listing for the second product in a second user interface for the second front-end taxonomy based at least in part on the classifying; and receiving, via the second user interface, a second user input corresponding to a transaction for the second product.

9. The method of claim 8, further comprising:

determining whether users searching for the first product are able to find the additional listing for the first product in the user interface for the second front-end taxonomy.

10. The method of claim 8, wherein the generating of the mapping includes generating a rule for classifying the first product that is applicable to additional products, the additional products being similar to the first product.

11. The method of claim 8, further comprising:

generating the global back-end taxonomy from product types discovered in an inventory of the first front-end taxonomy.

12. The method of claim 8, wherein the first front-end taxonomy corresponds to a first geographical region and the second front-end taxonomy corresponds to a second geographical region, the first geographical region being separated by a border from the second geographical region.

13. The method of claim 8, further comprising:

determining whether a seller of one of the additional products accepts the mapping via seller user input received via the user interface for the second front-end taxonomy when submitting a listing for the one of the additional products.

14. The method of claim 8, further comprising:

based on the testing reflecting a performance that does not transgress a performance threshold, discarding the mapping as an inaccurate mapping.

15. A non-transitory machine-readable medium comprising instructions that, when executed by one or more computer processors, cause the one or more computer processors to perform operations for updating mappings between products of a plurality of front-end taxonomies with a global back-end taxonomy, the operations comprising:

receiving, from a first system, first information pertaining to a first product that is to be listed on a first front-end taxonomy of the plurality of front-end taxonomies for the first system;

generating, by a global taxonomy module of one or more modules, a mapping of the first product to a category of a global taxonomy;

displaying an additional listing for the first product in a user interface for a second front-end taxonomy of the plurality of front-end taxonomies for a second system;

receiving a first user input monitoring user behavior with respect to the displayed additional listing;

testing, by the global taxonomy module of the one or more modules, the mapping based at least in part on the first user input;

based on the testing reflecting a performance that transgresses a performance threshold, accepting the generated mapping for use in mapping additional products to the category of the global taxonomy;

receiving, from the first system, second information pertaining to a second product that is to be listed on the first front-end taxonomy for the first system;

classifying, by the global taxonomy module of the one or more modules, the second product within the category of the global taxonomy based at least in part on the accepted mapping and the second information;

displaying a second listing for the second product in a second user interface for the second front-end taxonomy based at least in part on the classifying; and receiving, via the second user interface, a second user input corresponding to a transaction for the second product.

16. The non-transitory machine-readable medium of claim 15, wherein the operations further comprise:

determining whether users searching for the first product are able to find the additional listing for the first product in the user interface for the second front-end taxonomy.

17. The non-transitory machine-readable medium of claim 15, wherein the generating of the mapping includes generating a rule for classifying the first product that is applicable to additional products, the additional products being similar to the first product.

18. The non-transitory machine-readable medium of claim 15, wherein the operations further comprises:

generating the global back-end taxonomy from product types discovered in an inventory of the first front-end taxonomy.

19. The non-transitory machine-readable medium of claim 15, wherein the first front-end taxonomy corresponds to a first geographical region and the second front-end taxonomy corresponds to a second geographical region, the first geographical region being separated by a border from the second geographical region.

20. The non-transitory machine-readable medium of claim 15, wherein the operations further comprise:

determining whether a seller of one of the additional products accepts the mapping via seller user input received via the user interface for the second front-end taxonomy when submitting a listing for the one of the additional products.

\* \* \* \* \*